United States Patent [19]

Wraight

[11] Patent Number: 5,180,917
[45] Date of Patent: Jan. 19, 1993

[54] SELF-CALIBRATING PROPORTIONAL COUNTER

[75] Inventor: Peter D. Wraight, Missouri City, Tex.

[73] Assignee: Schlumberger Technology Corporation, Houston, Tex.

[21] Appl. No.: 754,342

[22] Filed: Sep. 4, 1991

Related U.S. Application Data

[63] Continuation of Ser. No. 742,778, Aug. 8, 1991, abandoned.

[51] Int. Cl.$^5$ .................. G01T 1/185; G01V 5/10
[52] U.S. Cl. .................. 250/374; 250/384; 250/252.1; 250/269; 250/390.01; 250/392; 313/93
[58] Field of Search .......... 250/252 R, 374, 390.01, 250/261, 391, 392, 269, 384; 313/93

[56] References Cited

U.S. PATENT DOCUMENTS

| | | |
|---|---|---|
| 2,842,695 | 7/1958 | Goodman. |
| 2,879,402 | 3/1959 | Ferre. |
| 3,034,008 | 5/1962 | Soloway. |
| 3,102,198 | 8/1963 | Bonner. |
| 3,240,971 | 3/1966 | Morgan. |
| 3,509,343 | 4/1970 | Locke. |
| 3,633,030 | 1/1972 | Antkiw et al. |
| 3,710,166 | 1/1973 | Perelman et al. .......... 250/374 |
| 3,829,686 | 8/1974 | Schultz et al. .......... 250/261 |
| 4,053,767 | 10/1977 | Kampfer et al. .......... 250/252.1 |
| 4,085,323 | 4/1978 | Turcotte et al. .......... 250/252.1 |
| 4,119,847 | 10/1978 | Waggoner .......... 250/252.1 |
| 4,220,851 | 9/1980 | Whatley, Jr. .......... 250/252.1 |
| 4,223,218 | 9/1980 | Jacobson .......... 250/262 |
| 4,300,043 | 11/1981 | Robbins .......... 250/262 |
| 4,423,323 | 12/1983 | Ellis et al. .......... 250/264 |
| 4,450,354 | 5/1984 | Smith, Jr. et al. .......... 250/256 |
| 4,760,252 | 7/1988 | Albats et al. .......... 250/269 |
| 4,879,463 | 11/1989 | Wraight et al. .......... 250/270 |
| 4,926,044 | 5/1990 | Wraight .......... 250/264 |

FOREIGN PATENT DOCUMENTS 162288 6/1990 Japan .......... 250/390.01

OTHER PUBLICATIONS

Konyushkov et al., "Absolute Energy Calibration of Low-Pressure Proportional Counters Containing Hydrogen" Institute of Biophysics, Moscow, translated from Pribory i Tekhnika Éksperimenta, 3, pp. 71-74, May–Jun., 1973.

"Recent Improvements in Helium-3 Solid State Neutron Spectrometry," by T. R. Jeter and M. C. Kennison, IEEE Transactions on Nuclear Science, Feb. 1967, vol. NS-14, No. 1, pp. 422–427.

"Radiation Detection and Measurement," by G. F. Knoll, Second Edition, 1989 pp. 160–170, 185–188, 485, 494–498, 527–530.

"Advancing Wellsite Radiation Safety," from D. Bramblett, P. Kurkoski, and C. Racster, in Schlumberger Oilfield Review, Oct. 1990, pp. 13–23.

"Recommendations for Neutron Logging from the SPWLA Subcommittee for Log Calibration Guidelines," by R. Wiley and L. S. Allen, The Log Analyst, May–Jun. 1988, pp. 204–214.

"A New Calibration, Wellsite Verification, and Log Quality-Control System for Nuclear Tools," by J. R. Olesen, SPWLA 31st Annual Logging Symposium, Jun. 24–27, 1990, Paper PP.

*Primary Examiner*—Carolyn E. Fields
*Attorney, Agent, or Firm*—Henry N. Garrana; John H. Bouchard; Darcell Walker

[57] ABSTRACT

The invention relates to a method and an apparatus for qualifying the operation of a radiation (e.g. neutron) detector containing an ionizable gas (e.g. He$_3$), such as a detector disposed in a logging sonde designed to be lowered in a well, wherein a radioactive source capable of ionizing said gas is disposed inside the detector. From the counts of the ionization pulses, one qualifies the operation of the detector. The method provides either a verification (usually performed before the logging operation, outside the well) or, when carried out while the detector is operating in the well, a stabilization of the measured spectrum.

Preferably, the internal source is an alpha source comprising uranium or americium and which is disposed inside the detector in the form of a thin foil.

37 Claims, 2 Drawing Sheets

SELF-CALIBRATING PROPORTIONAL COUNTER

This is a continuation of Ser. No. 07/742,778 filed Aug. 8, 1991 now abandoned.

BACKGROUND OF THE INVENTION

1. Field of the Invention

This invention relates to nuclear techniques for the investigation of a material, in order to determine the characteristics of such material, such as e.g. its composition. To this end, the material is irradiated with neutrons which interact with atoms in the material and are then detected. The detection is followed by an appropriate process of the neutron counts to provide the required information related to the material under investigation. By way of non limiting example, the invention can be advantageously implemented in the nuclear well logging techniques, wherein a sonde is lowered in a well or borehole and the earth formations surrounding the well are irradiated with neutrons from a neutron source disposed in the sonde. Radiations resulting from the interaction between the formation atoms and the emitted neutrons are detected and processed in order to derive information on the composition and/or the physical structure of the earth formation, or the borehole fluid, or the annulus including casing and cement located between the borehole wall and the formation. The invention can also be applied to logging while drilling technique (usually referred to as "LWD") where measurement devices, disposed close to the bottom of a borehole drilling system, perform measurements while the borehole is drilled.

2. Related Art

Neutron detectors can be used in numerous instances wherein the detected neutrons are representative of a material under investigation. The invention will be hereafter depicted in the context of the nuclear logging techniques wherein the material under investigation includes the earth formation surrounding a borehole. A sonde, including a neutron source and at least one neutron detector, is lowered in the borehole, and one detects the irradiating neutrons after they collide several times with atoms of the formation. Neutron logs are generated from the detected neutrons. Neutron logs are used principally for delineation of porous formations and determination of their porosity. They respond primarily to the amount of hydrogen in the formation. Neutrons are electrically neutral particles, each having a mass almost identical to the mass of a hydrogen atom. High-energy (fast) neutrons are continuously emitted from a radioactive source in the sonde. These neutrons collide with nuclei of the formation materials in what may be thought of as elastic "billiard-ball" collisions. With each collision, the neutron loses some of its energy. The amount of energy lost per collision depends on the relative mass of the nucleus with which the neutron collides. The greater energy loss occurs when the neutron strikes a nucleus of practically equal mass, i.e., a hydrogen nucleus. Collisions with heavy nuclei do not slow the neutron very much. Thus, the slowing of neutrons depends largely on the amount of hydrogen in the formation. Within a few microseconds, the neutrons have been slowed by successive collisions to thermal velocities, corresponding to energies of around 0.025 eV. They then diffuse randomly, without losing more energy, until they are captured by the nuclei of atoms such as chlorine, hydrogen, or silicon. The capturing nucleus becomes intensely excited and emits a high-energy gamma ray of capture. Depending on the type of neutron tool, either these capture gamma rays or the neutrons themselves are detected and counted by a detector in the sonde. When the hydrogen concentration of the material surrounding the neutron source is large, most of the neutrons are slowed and captured within a short distance of the source. On the contrary, if the hydrogen concentration is small, the neutrons travel farther from the source before being captured. Accordingly, the countering rate at the detectors increases for decreased hydrogen concentration, and vice versa. Examples of such logging sonde are described in U.S. Pat. Nos. 3,509,343 to Locke, or 4,223,218 to Jacobson, or 4,926,,044 to Wraight, which are all assigned to the assignee of the present application, and which are incorporated herein by reference. Neutron detectors are generally of the so-called proportional type, containing ionizable gas, such as e.g. helium-3 ($He_3$). $He_3$ detectors are exemplified in U.S. Pat. Nos. 3,240,971 or 3,102,198, or in the article "Recent Improvements in Helium-3 Solid State Neutron Spectrometry", by T. R. Jeter and M. C. Kennison, IEEE Transactions on Nuclear Science, February 1967. vol. NS-14 No. 1, pages 422–427, or in the book from G. F. Knoll, "Radiation Detection and measurement", Second Edition, 1989, p. 494–496. All of the above mentioned documents are incorporated herein by reference.

The use of known neutron detectors, e.g. in the above mentioned nuclear loggings sondes, raises two problems.

Firstly, since a neutron detector has substantially no background counts, its emits no signal in the absence of the neutron source of the sonde. This results in a detrimental uncertainty as to the operation of the detector. Accordingly, it is highly desirable to be able to verify or check, before the sonde is lowered in the well, that the neutron detector actually and properly works.

As a matter of general interest, the word "verification" here refers to a checking step of the "go-nogo" type. The word "calibration" here refers to ascertaining that the detector response, outside the well is the same as the response established during shop calibration. Finally, "stabilize" and "stabilization" here refer to any step aiming at checking that the response of the detector, while in operation in the well, do not show any substantial modifications, such as e.g. offset or drift, which would be detrimental to the measurements.

The second problem encountered when using known neutron detectors relates to the calibration of the detector(s). Calibration, in the context of logging, consists of adjusting at the wellsite, prior to logging the well, the tool response to match that of the engineering reference established under laboratory conditions. This accounts for variation in detector sensitivity from tool to tool and with time. It also accounts for variation in source strength, which changes with time. What is known as the wellsite calibration is actually not a primary calibration, but rather a "verification", the purpose of which is to confirm that the tool is functioning and that its response has not changed since the last "shop" calibration which are carried out in designated area under predetermined conditions and using a specific set-up. This verification is typically done by monitoring tool response to a point source of $\gamma$ rays or neutrons strapped onto the tool before it is lowered in the well for logging. The article "Recommendations for Neutron Logging from the SPWLA Subcommittee for Log Calibration Guidelines", by R. Wiley and L. S. Allen, The log Analyst, May–June 1988, pages 204–214, provides general background on the known methods for calibrating, at the surface, neutron detectors disposed in a logging sonde. This article is incorporated herein by reference.

The above mentioned "surface" calibration methods suffer from various disadvantages.

They are based on the use of an external radioactive source which raises safety concern. Strict regulations have been and are still being enacted which set forth the steps to take in view of minimizing, if not avoiding, the risk of accident. Implementing these regulations make the logging operations more complex and time consuming.

Furthermore, the hardware or set-up used to perform surface calibrations is designed to allow easy transportation, at the cost of being sensitive to the surrounding environment. In order to minimize, if not avoid, the influence of the environment, surface calibrations have to be performed according to strict guidelines. Consequently, those calibrations are time consuming. This is detrimental in a business environment where time is highly priced.

Moreover, being carried outside the well, these surface calibration methods do not provide any assurance to the operator that the detector is actually and properly working during the logging of the well. For the same reason, the detector response they provide is not representative of the downhole conditions especially in term of temperature and pressure.

As an attempt to remedy this situation, it has been proposed to carry out verification "in-situ", i.e. in the well, shortly prior to and following the logging operations, as explained in the article "A New Calibration, Wellsite Verification, and Log Quality-Control System for Nuclear Tools", by J. R. Olesen, SPWLA 31$^{rst}$ Annual Logging Symposium, Jun. 24–27, 1990, Paper PP. The in-situ verification method is usually referred to as the "plateau" method. The plateau refers to a flat part of the curve of total count rate versus detector high voltage. The detector voltage is adjusted so that the operating point is at the middle of the plateau, thereby ensuring constant detector sensitivity regardless of variation in temperature. The plateau test shows whether the tool is working in its middle range, the optimal operating point, rather than near the end. If the tool is working in the middle range of the plateau, this verifies that analog parts of the tool system have not drifted. Before logging, this verification is done typically a few hundred feet below surface where the tool is still at quasi-surface temperature and pressure. After logging, the verification is repeated typically just above the casing shoe, where the tool remains at logging temperature and pressure. The main advantage of the in-situ method compared with the surface method is that it is performed at in-situ temperature and pressure, and it is claimed to verify tool performance under operating conditions. For detectors showing the "plateau" phenomenon, the verifications carried out shortly before and after logging usually involve signals generated 1) by a special wellsite verification device, or 2) by the wellbore and logging source (as described in the above mentioned article by J. R. Olesen). The data obtained during these verifications are compared to similar data obtained at the time of the shop calibration. This verifies that, before and just after logging, the hardware was set at a stable operating condition similar to shop calibration conditions.

However, this "in-situ" verification method, although substantially improving over "surface" verification methods, does not overcome all the drawbacks of the latter. Particularly, the "in-situ" method is not performed in real time but actually is a verification "after the facts".

In view of the above, there is a strong need for a method which would provide the user with a reliable answer as to whether a neutron detector, actually and properly works. This need is all the more felt in the logging techniques where it is highly desirable to carry out the checking before the sonde, including the detector, is lowered in the well.

Moreover, beside the above referred to verification, it is highly desirable to stabilize, especially in real time, the actual response (usually a spectrum) of a neutron detector operating in a well.

OBJECTS OF THE INVENTION

A first object of this invention is to provide a method for reliably and quickly verifying the operation of a neutron detector.

A second object is to perform such verification in real time and safely without the use of a strong neutron source.

A third object of the invention is to provide a reliable method for stabilizing, in real time, the response of a neutron detector while in use in a well.

SUMMARY OF THE INVENTION

According to the invention, these and further objects are attained by a method for qualifying the operation of a radiation detector containing an ionizable gas, comprising:

disposing inside the detector a radioactive source capable of ionizing the gas;

detecting and counting the ionization pulses; and qualifying, from the counts of ionization pulses, the operation of the detector.

According to one embodiment, the method, as being applied to a neutron detector disposed in a logging sonde designed to be lowered in a well, is carried out at the surface, before the sonde is lowered in the well, and the qualifying step is a verifying step.

In an alternate embodiment, the method is carried out in the well during the operation of the detector, and comprises:

disposing inside the detector a radioactive source capable of ionizing the gas;

lowering the sonde in a well;

detecting and counting the ionization pulses, as well as detecting and counting the radiation of interest coming from the well and the formation surrounding the well;

generating a spectrum from the ionization pulse counts and the radiation counts;

detecting on the spectrum and energy peak characteristic of the radioactive source; and stabilizing the spectrum by modifying a functioning parameter (e.g. the gain) of the detector.

The method may further include, after the stabilizing step, the step of subtracting from the radiation counts the ionization pulse counts.

Advantageously, the detector is a neutron proportional counter and the gas comprises $He_3$.

Preferably, the radioactive source is an alpha source comprising a uranium or americium radioisotope, deposited inside the detector in the form of a thin foil of metal or other material.

The invention also contemplates a neutron detector including an ionizable gas and comprising means for verifying the operation thereof in the form of a radioactive source, capable of ionizing the gas, disposed inside the detector.

The characteristics and advantages of the invention will appear better from the description to follow, given by way of a nonlimiting example, with reference to the appended drawings in which:

DESCRIPTION OF THE INVENTION

This invention relates to a novel and improved method for verifying, calibrating and otherwise stabilizing a neutron detector. The invention will be hereafter described in relation with the logging techniques, being understood it can be implemented in many other technical fields involving the detection of neutrons. The method will be depicted in connection with a detector disposed in a logging sonde, an example of which is shown on FIG. 1. The invention relates also to such detector and to such logging sonde as well. The apparatus usable to accomplish the method might be of the type of that disclosed in U.S. Pat. No. 3,509,343 to S. Locke, U.S. Pat. No. 4,223,218 to Jacobson, U.S. Pat. No. 4,423,323 to Ellis & Flaum, U.S. Pat. No. 4,760,252 to Albats & Antkiw, or U.S. Pat. No. 4,926,044 to P. Wraight. These five patents are assigned to the assignee of the present application and are incorporated herein by reference. For an overall description of the tool, telemetry and surface instrumentation, the introductory portion of U.S. Pat. No. 4,926,044 is repeated below, in connection with FIG. 1, before turning to the description of the detector and the verification and stabilization method, in connection with FIGS. 2 and 3.

Figure 1:
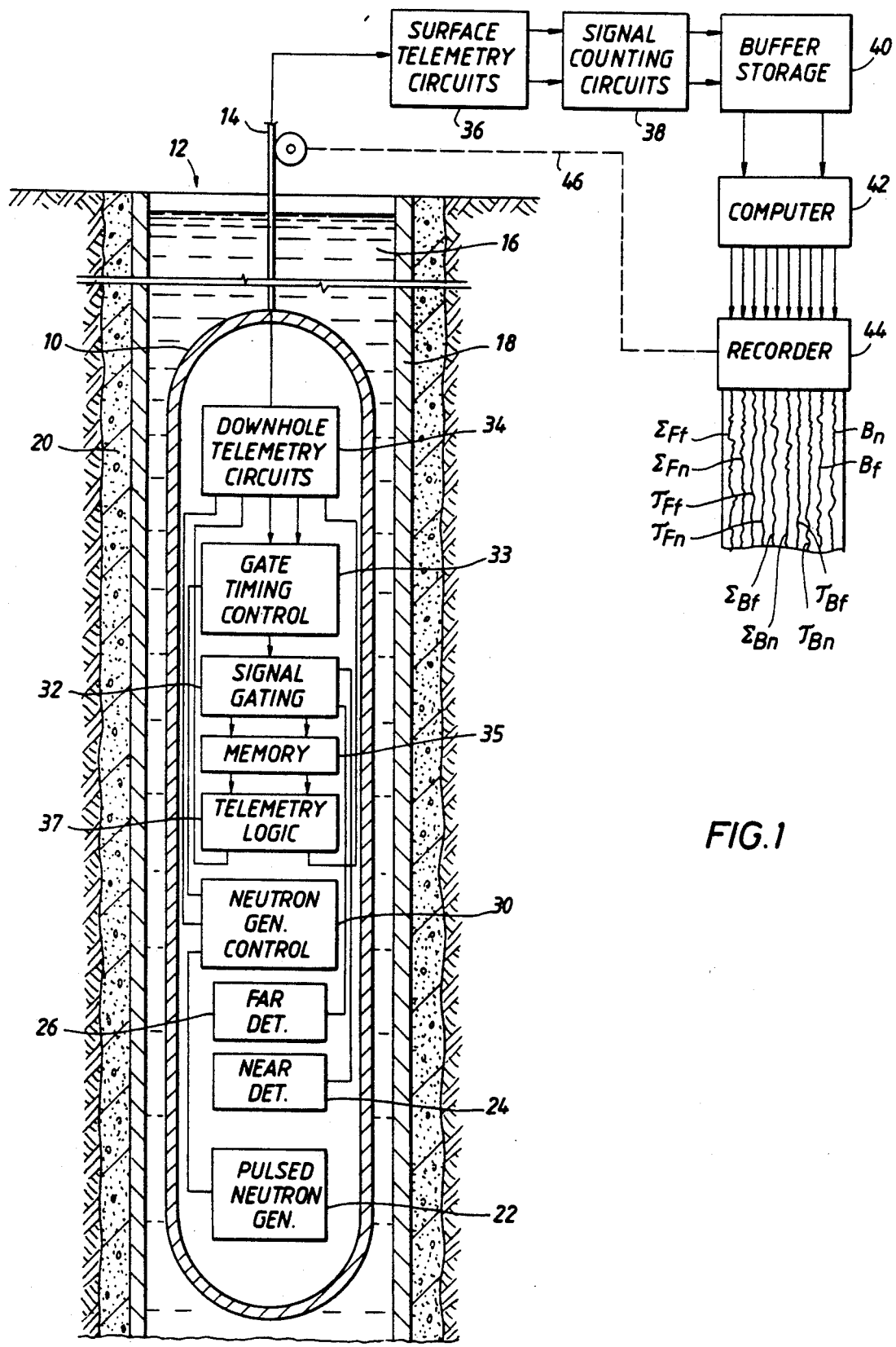
FIG. 1 is a schematic representation of a logging sonde usable for implementing the invention.

FIG. 1 shows a well logging tool including a fluid-tight, pressure-and-temperature resistance sonde or tool 10 that is adapted to be suspended in and moved through a well bore 12 by an armored cable 14. The well bore 12 is illustrated as containing a borehole fluid 16 and as including a steel casing 18 and surrounding cement annulus 20. Although no tubing is shown in the borehole, the tool 10 may if desired be sized for through-tubing use. The downhole tool 10 includes a pulsed neutron generator 22 and two neutron detectors 24 and 26 that are located at different spacings from the neutron generator 22. The detector 24 spaced closest to the neutron generator is designated the "near" detector and the detector 26 located farther from the neutron source is designated the "far" detector. The neutron generator 22 is preferably of the type which generates discrete pulses of fast neutrons, e.g. 14 Mev., and may for example be of the types described in more complete detail in U.S. Pat. No. 2,991,364 to C. Goodman, or U.S. Pat. No. 3,546,512 to A. H. Frentrop. Operation of the neutron generator 22 is controlled in part by a neutron generator control circuit 30, and this circuit may also be of the type described in the aforementioned patents. The detectors 24 and 26 may be of any construction suitable for the detection of the thermal neutron concentrations in the surrounding earth formation and, to that end, may be of the thermal neutron sensitive type, e.g. helium 3 filled proportional counters. It will also be understood that other downhole power sources (not shown) are provided as required to drive the neutron generator 22 and other downhole circuits. Power for the well tool 10 is supplied over the cable 14 from a surface power supply (not shown), as is conventional.

Output pulses from the neutron detectors 24 and 26, representative of the concentration of thermal neutrons in the irradiated formation, are applied to signal gating circuits 32. The signal gating circuits 32 are controlled by gate timing circuits 33, which also control the operation of the neutron generator control circuit 30. From the signal gating circuits 32 the detector signals are counted and stored in memory circuits 35 and thence, under control of telemetry logic circuits 37, are applied to downhole telemetry circuits 34 for transmission to the surface over the cable 14. The overall design of the neutron generator control circuit 30, the signal gating circuits 32, the gate timing circuits 33, the memory circuits 35, and the telemetry circuits 34 is similar to that described in the above mentioned U.S. Pat. Nos. 4,926,044 or 4,223,218 but are not described here for the sake of brevity. The circuits are designed to achieve the timing schedules for neutron bursting and detection. The downhole telemetry circuits 34 may be of any known construction for encoding, time division multiplexing, or otherwise preparing the data-bearing signals applied to them from the telemetry logic circuits 37 and for impressing such data on the cable 14. At the earth's surface, the data-bearing signals from the near and far detectors 24 and 26, respectively, are amplified, decoded, demultiplexed and otherwise processed as needed in the surface telemetry circuits 36, which may also be conventional. The telemetry circuits 34 and 36 also include circuits for the receipt and transmission, respectively of command message from the surface. Suitably, the circuits 34 and 36 comprise a bi-directional data telemetry system useful for these purposes and having a 10K bit per second upward data rate. Following surface telemetry circuits 36 the near-detector and far-detector signals are separately counted in signal counting circuits 38 to acquire the thermal neutron decay curve data over a desired accumulation interval $\Delta t$. Upon termination of the data accumulation time $\Delta t$, which may be selected, for example, to correspond to a desired interval of depth in accordance with logging speed of the tool, the count rate data accumulated in the signal counting circuits 38 and transferred to buffers 40 and the signal counting circuits 38 are reset to zero. From storage 40, the count rate data are processed in a computer 42, which suitably comprises a micro-processor or, alternatively, a general purpose digital computer such as that manufactured by Digital Equipment Corporation, Maynard, Mass., under the designation PDP-11. As is described more fully hereinafter, the computer 42 processes the count rate data from the respective detectors to develop various desired outputs, including, for example, the decay time constants of the borehole and formation as measured with the near detector, $\tau_{Bn}$ and $\tau_{Fn}$, and the decay time constants of the borehole and formation as measured with the far detector, $\tau_{Bn}$ and $\tau_{Fn}$, the corresponding macroscopic capture cross-sections $\Sigma_{Bn}$, $\Sigma_{Bf}$, $\Sigma_{Fn}$ and $\Sigma_{Ff}$, and various other selected outputs such as background counting rating $B_n$ and $B_f$, from the respective detectors. All of these outputs may be recorded in conventional fashion as a function of tool depth in a recorder 44. The usual cable-following mechanical linkage, indicated diagrammatically at 46 in FIG. 1, is provided for this purpose.

Figure 2:
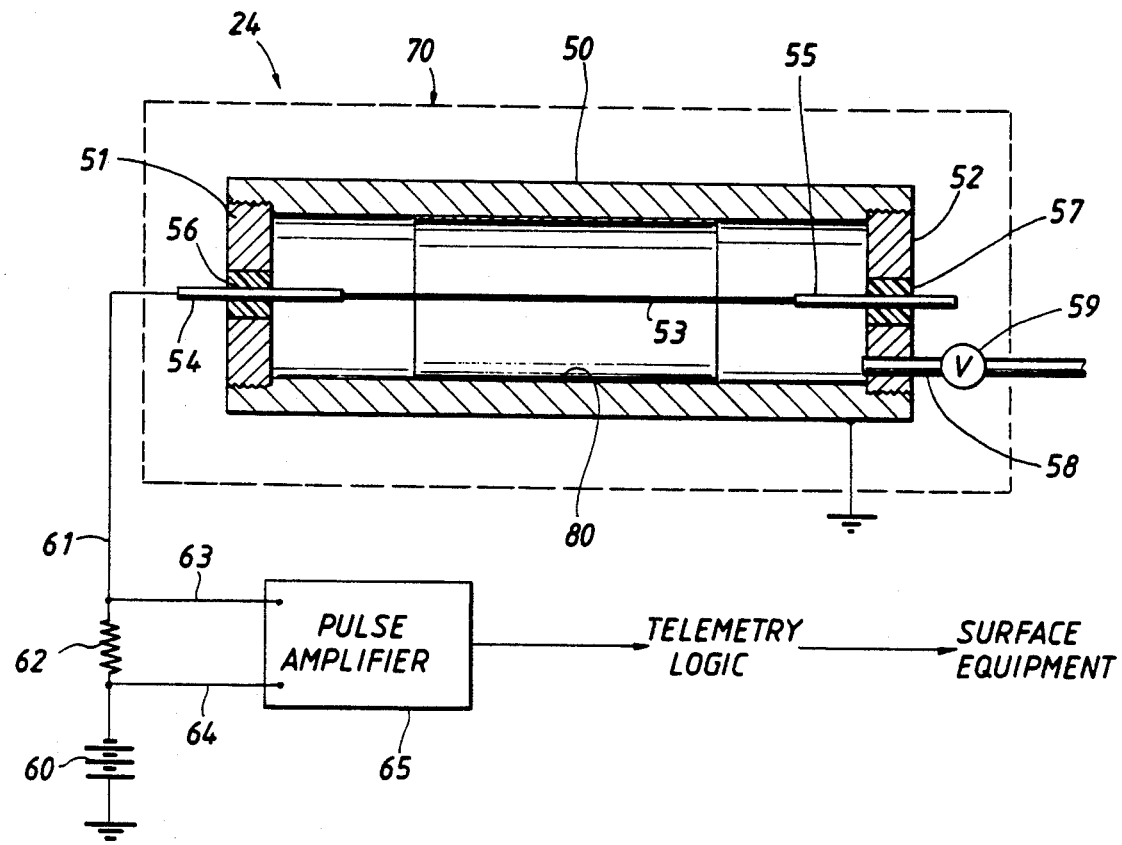
FIG. 2 shows a cross section of a $He_3$ detector including the verification and stabilization means of the invention.

The neutron detector according to the invention, e.g. detector 24 of FIG. 1, will be hereafter described in detail, in connection with FIG. 2.

Detector 24 comprises a cylinder 50 made of material which do not show any neutron resonances in the thermal and epithermal regions. Cylinder 50 may be made e.g. of aluminum. On both ends of cylinder 50 are threaded respective end plates 51, 52 in such a way that the inside volume delimited by cylinder 50 and end plates 51 and 52 defines a high gas pressure sealed chamber. An electrode 53 made of a metallic wire, substantially centered in cylinder 50, is anchored at both ends thereof in end plates 51 and 52 by means of respective rods 56 and 57. Rods 56 and 57 each extends through a ring 56, 57 centered on end plates 51, 52. Rings 56, 57 are designed to mechanically maintain and electrically insulate rods 56, 57 (and thus electrode 53) from the metallic structure made of end plates 51, 52 and cylinder 50. For example, rings 56, 57 are made of quartz or ceramic. A tube 58 extends through end plate 52 and is provided with a pressure valve 59. Tube 58 is connected to a high pressure gas source (not shown). When completed, the above described structure is filled through tub 58 with high pressure He$_3$ gas. A dotted line 70 surrounding cylinder 50 represents an optional shield made of cadmium or boron designed to absorb thermal neutrons and pass epithermal neutrons to the inside of cylinder 50.

The electrode 53 is electrically connected to a DC source 60 through a line 61 and a resistor 62. Cylinder 50 and the pole of DC source 60 opposed to resistor 62, are connected to the ground. Voltage developed across resistor 62 is applied (through appropriate connection 63, 64) to a pulse amplifier 65. As it is known in the art, signals output from amplifier 65 are processed and transmitted to the surface equipment through the downhole circuits provided in the sonde 10, as shown on FIG. 1.

More details on the overall construction of detector 24 can be found in U.S. Pat. Nos. 3,102,198 to T. W. Booner, or 3,240,971 to I. L. Morgan, which are both incorporated herein by reference. In the Bonner patent, there is illustrated a detector of the proportional counter type which comprises a cylinder which may be relatively thin and made of aluminum. Each plates are fitted to the ends of the cylinder and are sealed as to withstand high gas pressures. A metallic electrode formed of small diameter wire is anchored in suitable terminals centrally mounted in the end plates and insulated from the cylinder. The cylinder is filled with helium-3 at a substantially elevated or superatmospheric pressure of at least several atmospheres, and preferably of the order of two to twenty atmospheres. The tritium content of the Helium-3 is reduced so as to be less than one part in $10^{11}$ parts. In the Morgan patent, it is disclosed that an essential requirement for a counter of high sensitivity having a filling consisting in the main of helium-3 is that this gas must, for proper detection and measurement of very low neutron flux, be purified to remove all traces of tritium to a degree heretofore unknown as the beta particles emission of tritium produces ionization in the chamber of the counter. This is relatively innocuous in a spectrometer-type instrument in which high sensitivity is normally of secondary or negligible interest. Further, the low beta background appearing from this source when the helium-3 is a relatively minor component is not a substantial concern in an instrument for making measurements at high intensities. However, even in this case, some problems are encountered from this beta emission with respect to spectrometer use of such a detector. When the entire filling of a superatmospheric pressure counter is helium-3 the beta pile-up emanating from the helium-3 can create a noise which readily becomes indistinguishable from the measured signal when sensitive measurements of thermal neutrons are attempted. It is found that the tritium content of any helium-3 counter of practical size, filled in the operational superatmospheric pressure ranges for use as a detector of thermal neutrons, must be less than one part in $10^{10}$, and preferably less than one part in $10^{11}$, in order that the device be operative for its purpose as a sensitive thermal neutron detector.

A means for verifying the operation of the detector is provided inside thereof, in particular in the form of an alpha source. The alpha source might include any radioisotope source which emits alpha particles by radioactive decay (see Knoll's book, Table 1-3, page 9, and page 7, Chapter 1, III, A last paragraph, incorporated herein by reference) for example, uranium or americium. Preferably, the radioisotope is deposited inside the cylinder 50 in the form of a thin foil 80, e.g. a metallic foil. In a preferred embodiment, the alpha source is chosen in a way its emission does not interfere with the neutron counts resulting from the actual measurement carried out in the well. For illustrative purpose, the alpha source generates a few counts per second (cps), typically 10 cps, which is far below the lowest count rate that is detected in operation in the well.

Moreover, the alpha source has an activity below the typical threshold value (usually called "wipe test" threshold of 5 nanocurie, established by regulation for safety purpose.

The internal alpha source provides a reliable and clear indication of the correct operation of the detector. This eliminates the need for the known external strong sources which, as already stated above, are cumbersome and may be detrimental to safety. Also, using an alpha source is beneficial since alpha particles constitute the ionization particles themselves which results in almost 100% detection. Finally, the alpha source has a weak activity, of the order of 1 nanocurie which is compatible with safety concerns and does not interfere with count rates resulting from actual measurements in the well.

Figure 3:
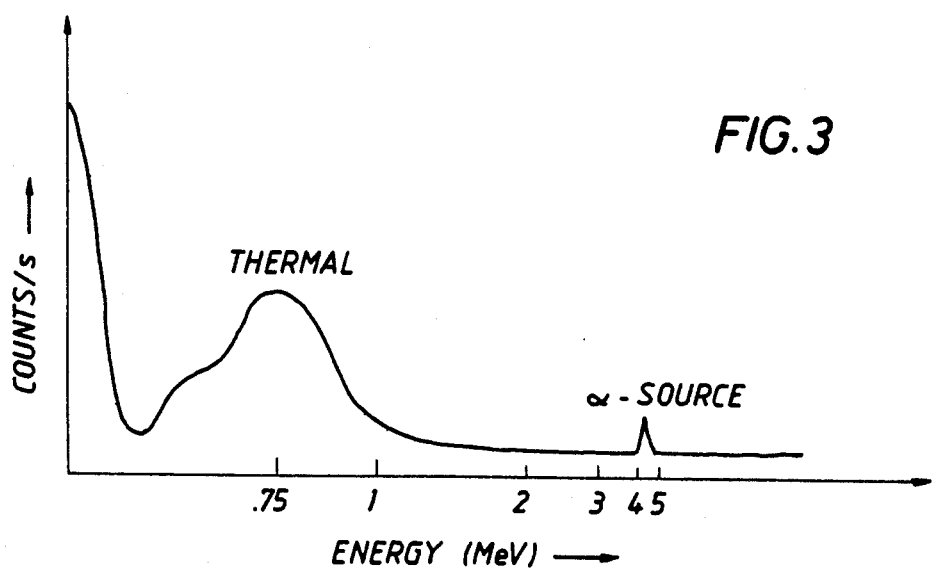
FIG. 3 is a graphical representation of a typical spectrum of detected neutrons and the ionization pulses generated by the radioactive source, during a logging operation in a well.

Furthermore, the internal alpha source allows one to stabilize the response of the detector while in use. This is valuable in the instance when the detector is not accessible during its operation, such as e.g. when logging a well. The response is a spectrum generated from the neutrons which are detected after they have interacted with the atoms of the formation. The emission spectrum of an alpha source shows an energy peak, around 4 Mev, which is clearly distinguishable from the detected spectrum. FIG. 3 is a representation of a typical measured spectrum (counts per second versus energy) of detected neutrons and the ionization pulse generated by the radioactive source, during operation in a well. The energy scale is nonlinear for the sake of clarity. The measured spectrum shows a protuberance in the thermal region (0.75 Mev) and an energy peak at 4.2 Mev representative of the internal alpha source. The alpha source energy peak can be used as a stabilization peak, while logging, thus providing control over the gain response of the detector.

According to an alternate embodiment of the invention, the stabilization is performed by using the thermal neutron peak itself.

The stabilization process, based on the use of the alpha source peak or the thermal neutron peak, can be carried out in any conventional way. For example, one could use the method described in U.S. Pat. No. 3,976,878 to P. Chevalier and B. Seeman, which is incorporated herein by reference. According to the method depicted in the '878 patent, two count rates $M_1$ and $N_1$ are measured in two windows of predetermined width located on each side of the 4.2 MeV energy peak of the stabilization source (i.e. the alpha source). An error signal, which is a function of the difference $(M_1 - N_1)$, is used to control a functioning parameter, such as the high voltage which affects the gain, of the detector through a negative feedback loop. Alternately, the gain stabilization can be performed as taught in Knoll's book, pages 670–672, paragraph entitled "Spectrum stabilization".

What is claimed is:

1. A radiation detector of the proportional counter type comprising a pressure-tight closed container pervious to transmission therethrough of neutrons in the thermal and epithermal energy regions, an electrode extending through said container is spaced relation with the enclosing walls and insulated therefrom, a detector gas within said container consisting substantially of helium-3 at a superatmospheric pressure and having a tritium content of less than one part in ten-to-the-ten parts, a source of radioactivity capable of ionizing said gas, said source being disposed within said closed container and selected so as to have a radioactivity level of less than 5 nanocuries, and circuit connections extending to said electrode and to said container for application thereto of an electric potential, said source of radioactivity having a characteristic peak at energies greater than 3 MeV.

2. The radiation detector of claim 1 in which said source of radioactivity is selected so as to generate a radiation count rate of about ten counts per second.

3. The radiation detector of claim 1 in which said helium-3 is at a pressure of at least two and one-half atmospheres absolute.

4. The radiation detector of claim 1 in which said source of radioactivity is an alpha particle source located on a portion of the inside surface of said enclosing walls.

5. The radiation detector of claim 4 in which said source of radioactivity is an isotope of americium.

6. The radiation detector of claim 4 in which said source of radiation is an isotope of uranium.

7. The radiation detector of claim 1 in which said source of radioactivity is an isotope of uranium.

8. The radiation detector of claim 1 in which said source of radiation is an isotope of americium.

9. A radiation detector of the proportional counter type comprising a pressure-tight closed container pervious to transmission therethrough of neutrons in the thermal and epithermal energy regions, an electrode extending through said container in spaced relation with the enclosing walls and insulated therefrom, a detector gas within said container of composition and pressure characterized by its sensitivity to neutrons in the thermal and epithermal regions and its insensitivity to gamma rays, a source located on a portion of the inside surface of said enclosing walls comprising a radioactive material which emits alpha particles by radioactive decay having a radioactivity level of less than 30 nanocuries, and circuit connections extending to said electrode and to said container for application thereto of an electrical potential, wherein said gas consists of high purity helium-3 present at a pressure of at least seven atmospheres absolute and having a tritium content of less than one part in ten-to-the-ten parts.

10. The radiation detector of claim 9 in which said radioactive material emits alpha particles at a rate of about ten counts per second.

11. The radiation detector of claim 10 in which said radioactive material is an isotope of uranium.

12. The radiation detector of claim 10 in which said radioactive material is an isotope of americium.

13. A radiation detector of the proportional counter type comprising a pressure-tight closed container pervious to transmission therethrough of neutrons in the thermal and epithermal energy regions, an electrode extending through said container in spaced relation with the enclosing walls and insulated therefrom, a detector gas within said container of composition and pressure characterized by its sensitivity to neutrons in the thermal and epithermal regions and its insensitivity to gamma rays, a source located on a portion of the inside surface of said enclosing walls comprising a radioactive material which emits alpha particles by radioactive decay having a radioactivity level of less than 30 nanocuries, and circuit connections extending to said electrode and to said container for application thereto of an electrical potential, wherein said gas consists of high purity helium-3 at a pressure of at least two and one-half atmospheres absolute and the radioactivity level of said source is less than 5 nanocuries.

14. The radiation detector of claim 13 in which said radioactive material is an isotope of americium.

15. The radiation detector of claim 13 in which said radioactive material is an isotope of uranium.

16. The radiation detector of claim 13 in which said radioactive material has a characteristic peak at energies greater than 3 MeV.

17. A radiation detector of the proportional counter type comprising a pressure-tight closed container pervious to transmission therethrough of neutrons in the thermal and epithermal energy regions, an electrode extending through said container in spaces relation with the enclosing walls and insulated therefrom, a detector gas within said container of composition and pressure characterized by its high sensitivity to neutrons in the thermal and epithermal regions and its insensitivity to gamma rays, said gas consisting substantially exclusively of high purity helium-3 at a superatmospheric pressure, a source inside said container comprising a radioactive isotope which emits alpha particles by radioactive decay and has a radioactivity level of less than 30 nanocuries, and circuit connections extending to said electrode and to said container for application thereto of potential.

18. The radiation detector of claim 17 in which a shield pervious to neutrons of epithermal level and impervious to neutrons of thermal level is disposed in the form of a housing surrounding said container.

19. The radiation detector of claim 17 in which said source is selected so as to generate a radiation count rate of about ten counts per second.

20. The radiation detector of claim 19 in which said radioactive isotope is an isotope of uranium.

21. The radiation detector of claim 19 in which said radioactive isotope is an isotope of americium.

22. The radiation detector of claim 17 in which said helium-3 is at a pressure of at least one and one-half atmospheres absolute and the radioactivity level of said source is less than 5 nanocuries.

23. The radiation detector of claim 17 in which said source is located on a portion of the inside surface of said enclosing walls.

24. The radiation detector of claim 23 in which said radioactive isotope is an isotope of uranium.

25. The radiation detector of claim 23 in which said radioactive isotope is an isotope of americium.

26. The radiation detector of claim 17 in which said radioactive isotope has a characteristic peak in the radiation energy spectrum to which said detector is sensitive.

27. The radiation detector of claim 17 in which said radioactive isotope is an isotope of uranium.

28. The radiation detector of claim 17 in which said radioactive isotope is an isotope of americium.

29. A logging tool comprising: an elongated external housing; a first radiation detector of the proportional counter type carried within said housing and comprising a pressure-tight closed container pervious to transmission therethrough of neutrons in the thermal and epithermal energy regions, an electrode extending through said container in spaced relation with the container walls and insulated therefrom; a detector gas within said container of helium-3 at a superatmospheric pressure; a source placed inside said container which emits particles by radioactive decay; the radioactivity level of said source outside of said housing being less than 5 nanocuries; circuit connections extending to said electrode and to said container for application thereto of an electrical potential; and means for monitoring variations in said electrical potential; wherein said source has an emission spectrum with a characteristic peak above 3 MeV.

30. The logging tool of claim 29 in which a shield pervious to neutrons of epithermal level and impervious to neutrons of thermal level is disposed surrounding said container.

31. The logging tool detector of claim 29 in which said source is selected so as to generate a radiation count rate of about ten counts per second as detected by said monitoring means.

32. The radiation detectors of claim 31 in which said source is an isotope of uranium.

33. The radiation detectors of claim 31 in which said source is an isotope of americium.

34. The logging tool of claim 29 further comprising a second radiation detector of substantially the same construction as said first radiation detector and disposed in spaced apart relation relative thereto along the elongation direction of said external housing.

35. The radiation detectors of claim 34 in which said source is located on a portion of the inside surface of said container walls of each of said radiation detectors.

36. The radiation detector of claim 29 in which said source is an isotope of uranium.

37. The radiation detector of claim 29 in which said source is an isotope of americium.

* * * * *